Nov. 27, 1962
H. G. NEIL
3,065,629
APPARATUS FOR DETERMINING PHYSICAL
PROPERTIES OF POROUS MATERIAL
Filed May 23, 1957
3 Sheets-Sheet 1
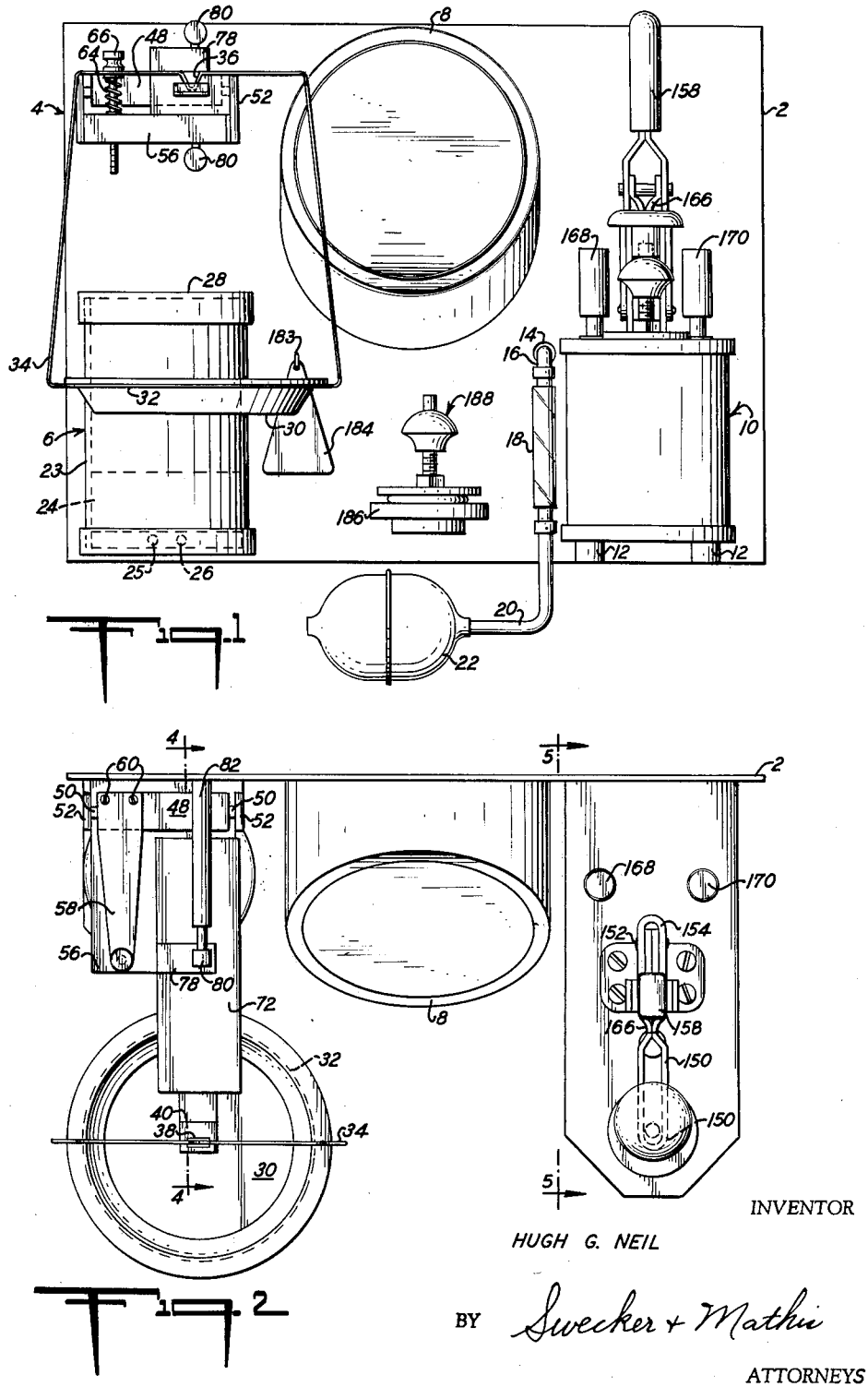
INVENTOR
HUGH G. NEIL
BY Swecker + Mathis
ATTORNEYS Nov. 27, 1962
H. G. NEIL
3,065,629
APPARATUS FOR DETERMINING PHYSICAL
PROPERTIES OF POROUS MATERIAL
Filed May 23, 1957
3 Sheets-Sheet 2
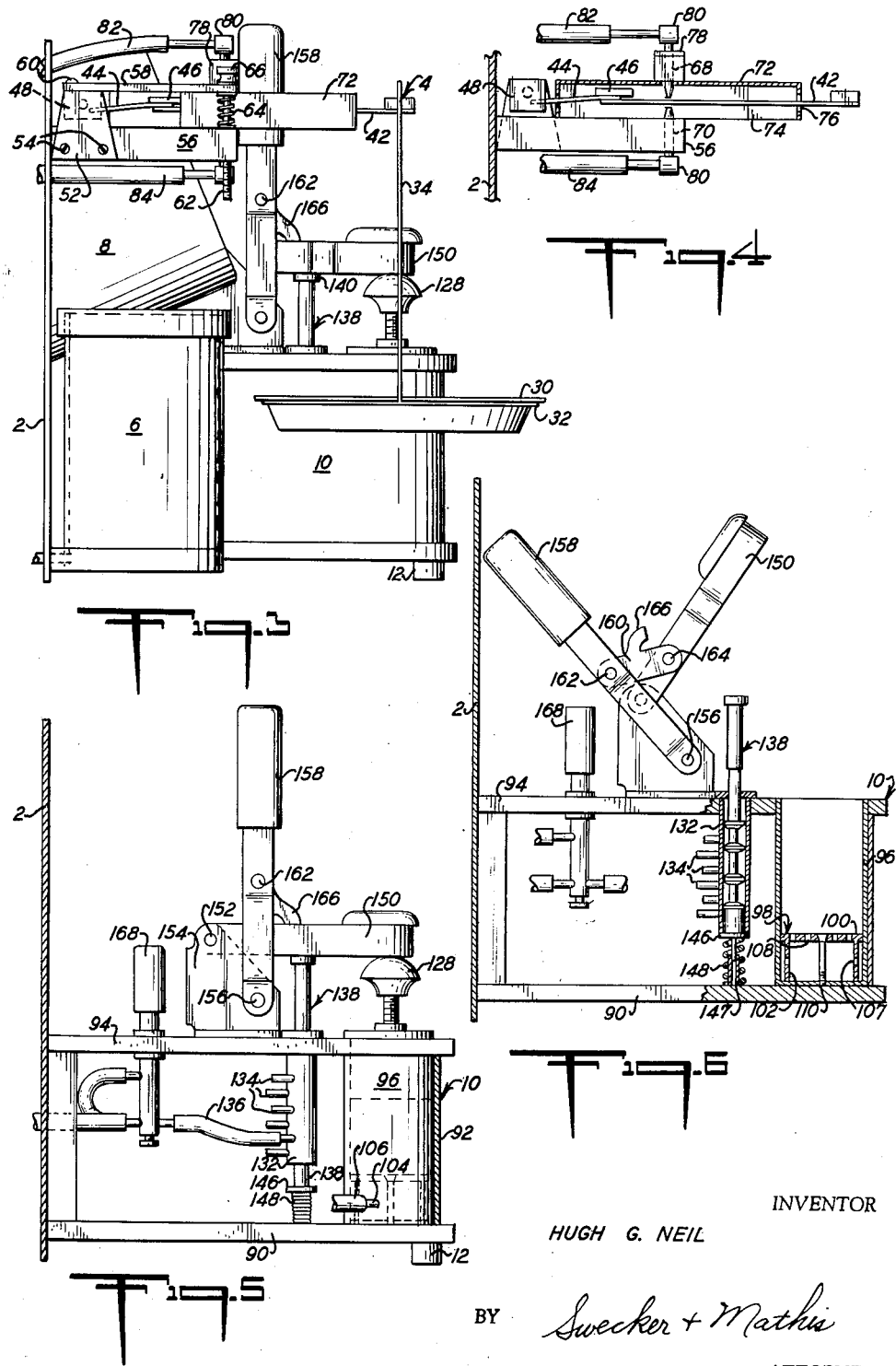
INVENTOR
HUGH G. NEIL
BY *Swecker + Mathis*
ATTORNEYS

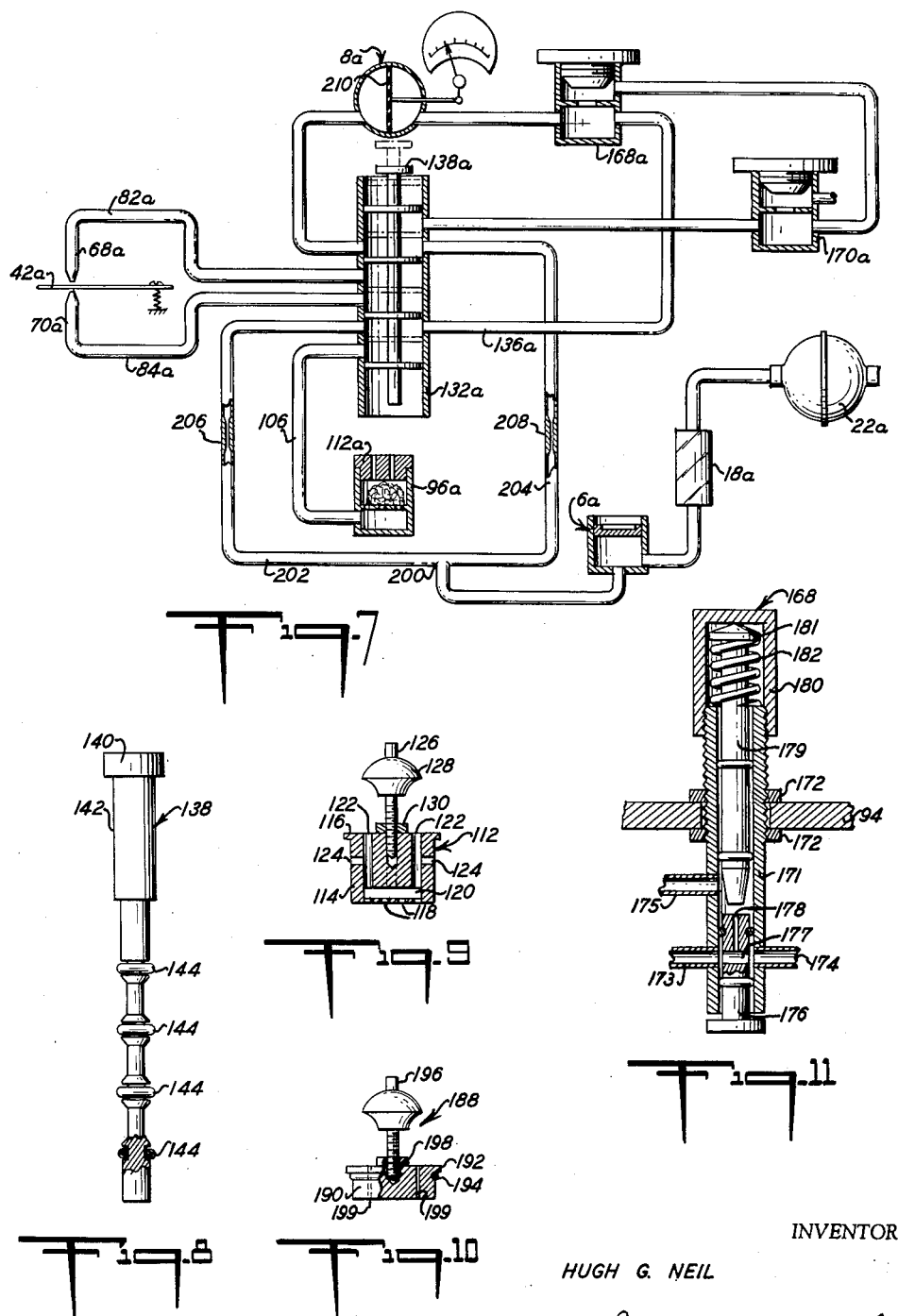

United States Patent Office 3,065,629
Patented Nov. 27, 1962

3,065,629
APPARATUS FOR DETERMINING PHYSICAL PROPERTIES OF POROUS MATERIAL
Hugh G. Neil, Knoxville, Tenn., assignor, by mesne assignments, to The University of Tennessee Research Corporation, Knoxville, Tenn., a corporation of Tennessee
Filed May 23, 1957, Ser. No. 661,224
10 Claims. (Cl. 73—38)

This invention relates to measuring apparatus, and more particularly to apparatus for determining the fineness of textile fibers through porosity measurements.

It is known that for equal weights of fiber confined in equal spaces, the finer fibers offer more resistance to the passage of air, or other fluid, through the sample than do the coarser fibers. This phenomenon forms the basis for air-flow fineness measurements, and several instruments have been developed for measuring fineness in this manner. Examples of such instruments are disclosed in Patents Nos. 2,352,835, 2,352,836, 2,484,507, and 2,706,904, granted to Kenneth L. Hertel.

Although the underlying principles involved in air-flow fineness measurements have received much attention in the literature and although instruments utilizing these principles have been used successfully in laboratory testing, much difficulty has been experienced by workers in this field in their attempts to provide instruments capable of producing accurate results under field conditions.

It will be appreciated in this connection that the practical requirements for a successful field instrument differ significantly from those applicable to a laboratory instrument. The field instrument must be so simple and so rugged that it may be used by relatively unskilled operators under widely varying environmental conditions to produce results of reasonable accuracy. In contrast, the laboratory instrument ordinarily is operated by trained technicians in a controlled environment. It is also desirable that a field instrument be compact and light in weight, so that it may be moved easily from one location to another by the operator.

Accordingly, it is a general object of this invention to provide improved porosity measuring apparatus so constructed that it may be used to determine fiber fineness under field conditions.

Another objects of the invention is to provide porosity measuring apparatus with means for accurately determining the weight of a sample to be tested, which means is constructed so that it may be operated under a variety of environmental conditions and so that it will not detract from the portability of the apparatus.

Yet another object of the invention is to provide a fluid-operated measuring instrument with novel means for adjusting its sensitivity and for calibrating it.

Still another object of the invention is to provide a fluid-operated measuring instrument having a number of alternately operable fluid conduits with a novel fluid switch structure for connecting the several conduits together in the desired manner.

The foregoing objects are accomplished, according to one embodiment of the invention, by the provision of a novel combination of fluid conduits so arranged and connected together as to permit the determination of both the weight and the porosity of a sample of porous material. Both of these determinations are made through the use of bridge-type fluid circuits, which operate in a manner comparable to the well-known Wheatstone bridge circuits employed in electrical meters of various kinds.

The sample to be weighed is placed upon resilient means which includes a member capable of moving in response to the weight of the sample. Movement of such member is detected by a fluid system having at least one, and preferably two, nozzles disposed in proximity to the movable member so that the flow of fluid through these nozzles varies in accordance with the movements of the movable member. Such variations in the resistance to fluid flow through the nozzles are detected by a fluid bridge system and indicated on a meter connected across intermediate points of the bridge.

The construction is such that portions of this air bridge system may be employed also in the determination of the porosity of the sample. A fluid switch disposed in the system is operable to disconnect the nozzles after the weighing operation and to connect two other conduits into the bridge system. One of these is adapted to contain the weighed sample, and the other is provided with an adjustable needle valve having a substantial resistance to fluid flow. Hence, operation of the air switch conditions the apparatus for the making of a porosity determination.

In order to compensate for pressure variations of substantial magnitudes in the air supplied to the bridge systems, so as to prevent injury to the meter, a restricted shunt path is connected in parallel with the meter. This shunt path includes an adjustable needle valve which permits regulation of the resistance of the shunt path to control the sensitivity of the meter.

A more complete understanding of the invention, and an awareness of still other objects and advantages of it, will be gained from a consideration of the following detailed description of an embodiment illustrated in the accompanying drawings, in which:

FIG. 1 is a front elevational view of an instrument embodying the principles of the present invention;

FIG. 2 is a top plan view of the instrument of FIG. 1;

FIG. 3 is a side elevational view;

FIG. 4 is a partial vertical cross sectional view taken along the line 4—4 in FIG. 2;

FIG. 5 is a vertical cross sectional view taken along the line 5—5 in FIG. 2, with a portion of the housing broken away;

FIG. 6 is a vertical cross sectional view similar to FIG. 5, but showing the parts in different positions and showing some of the parts in cross section;

FIG. 7 is a flow diagram of the instrument of FIGS. 1 through 6;

FIG. 8 is a detail elevational view, partly in section, of an air switch element employed in the embodiment of the invention illustrated in FIGS. 1 through 6;

FIG. 9 is a detail vertical cross sectional view of a closure for the sample chamber of the instrument of FIGS. 1 through 6;

FIG. 10 is a detail vertical cross sectional view of a calibrating device of standard porosity which may be inserted into the sample chamber when calibrating the instrument; and FIG. 11 is an enlarged vertical cross sectional view of an adjustable needle valve employed in the embodiment of FIGS. 1 through 6.

Referring initially to FIGS. 1 and 2, the illustrated instrument includes a vertical support panel 2, to which the several elements of the apparatus are attached. The support panel 2 normally is fixed to an interior wall of a suitable casing, but the casing has been omitted from the drawings in the interest of simplicity.

Fixed to the front face of the support panel 2 are a weighing mechanism 4, a pressure regulator 6, a meter 8, and a housing 10 for a group of elements which will be identified below. The housing 10 is provided with a pair of depending protrusions 12 near its forward end for cooperating with the lower end of the support plate 2 to impart stability to the instrument when the instrument is disposed upon a horizontal surface.

In practice, a plurality of flexible air conduits extend along the rear face of the support plate 2, to connect the several elements of the instrument together. These conduits have been omitted from the drawings, however, in the interest of simplicity. The flow diagram of FIG. 7 adequately illustrates the connections between the several elements, and detailed reference will be made to such diagram as the description proceeds.

The front face of the support plate 2 also carries a fitting 14 (FIG. 1) for an air hose 16 which leads from the rear of the plate 2 through a filtering device 18 and another flexible tube 20 to an atomizer bulb 22. The bulb 22 is collapsible and is provided with check valves at its ends. When the bulb 22 is collapsed, air is ejected into the tube 20, and then when the bulb is allowed to expand again, air is drawn into the opposite end of the bulb. This construction is so well known that no useful purpose would be served by further elaboration here.

The pressure regulator 6 is of conventional construction in that it includes a vertical cylinder 23 having a free floating piston 24 disposed therein. Air is forced into the cylinder 23 below the piston 24 through an opening 25, and air is exhausted from the cylinder 23 through another opening 26. Since the piston 24 is free, the exhaust pressure is substantially constant and is determined by the weight of the piston 24.

A removable cover member or lid 28 is positioned upon the top of the cylinder 23 to prevent the entrance of foreign matter into the cylinder. If desired, the pressure of the air in the system may be regulated by adding weights to or removing weights from the piston 24.

The weighing mechanism 4 includes a pan 30 upon which a sample of porous material or a standard weight may be supported during the weighing operation. The pan 30 is carried by a wire ring 32 attached to a bail 34 which has a depending U-shaped portion 36 disposed above the center of the pan 30. The bottom of the depending portion 36 is received loosely within a notch 38 in the upper surface of a block 40 fixed to the outer end portion of an elongated arm 42.

It is preferred that a viscous lubricant is disposed within the notch 38 to damp swinging movement of the pan 30. This is particularly important in the weighing of cotton samples, for example, because the weighing must be carried out in such a manner as to give very accurate results. Such results can be obtained only when the center of gravity of the sample is stationary and is disposed directly below the pivot point.

As shown in FIGS. 3 and 4, the arm 42 is connected at its rear end to a soft leaf spring 44 by means of a clamp designated by the numeral 46. This clamp may be of any desired construction, or if desired, the arm 42 may be welded or secured in any other suitable manner to the outer end of the spring 44.

The spring 44 is fixed to a block 48 pivotally mounted by means of pins 50 upon vertical ears 52. The ears 52 are secured by screws 54, for example, to a horizontal member 56, fixed rigidly to the vertical support 2.

The upper face of the block 48 has secured thereto, by screws 60 or other suitable means, a forwardly extending arm 58. The forward end of the arm 58 is penetrated loosely by an adjusting screw 62 threadedly connected to the horizontal support member 56. A compression spring 64 surrounds the adjusting screw 62 in the space between the horizontal support member 56 and the arm 58, and serves to urge the outer end portion of the arm 58 upwardly. An enlarged head 66 is carried by the adjusting screw above the arm 58 so as to limit the extent of such movement.

The compression spring 64 is relatively stiff, and the adjusting screw 62 serves to load the stiff compressed spring 64 to such an extent that a substantial upward force is applied to the arm 58. Thus, although the block 48 is mounted for pivotal movement by the pins 50, it is normally stationary. Weights of the order desired for a sample to be tested in the instrument may be applied to the pan 30 without deflecting the stiff compression spring 64. The leaf spring 44, however, is relatively soft, and when a weight is applied to the pan 30, the leaf spring 44 bends so as to lower the outer end portion of the arm 42 upon which the pan 30 is suspended. It is preferred that the arm be sufficiently rigid, as compared with the leaf spring 44, to remain straight under the influence of the load applied to it when a weight of the intended magnitude is disposed within the pan 30.

It will be evident that the amount of deflection of the leaf spring 44 is a measure of the weight disposed within the pan 30. The greater the weight, the greater will be the deflection of the leaf spring 44. The present invention contemplates the measurement of the degree of deflection of the leaf spring 44 by means of a pair of opposed air jets issuing from stationary nozzles 68 and 70 disposed above and below the arm 42. Since the air strikes the movable member or arm 42 immediately after emerging from the nozzles 68 and 70, the resistance to air flow through the respective nozzles is a function of the proximity of the arm 42 to them. Thus, as the arm 42 moves downwardly from its illustrated position, under the influence of a weight in the pan 30, the resistance of the nozzle 70 will increase and the resistance of the nozzle 68 will decrease. These changes in resistance are utilized in a manner described below to obtain an indication of the weight in the pan 30.

Since the arm 42 is rigid, as compared with the spring 44, substantially all of the deflection in the system takes place in the spring 44. Hence, the disposition of the nozzles 68 and 70 adjacent the arm 42, rather than adjacent the spring 44, eliminates the possibility of irregularities due to curvature of the deflectable member under load.

The nozzles 68 and 70 have their inner end portions disposed within a shielding structure 72, carried by the horizontal support member 56, and partially surrounding the arm 42. It should be noted, however, that there is an elongated opening 74 in the bottom of the housing 72, through which air may escape freely. Other openings in the housing may be provided for this purpose, if desired.

The forward end of the housing 72 is provided with a horizontal slot 76 through which the arm 42 passes. As indicated in FIG. 4, the slot 76 has a vertical extent substantially greater than the thickness of the arm 42, so that the arm 42 may move in response to deflections of the leaf spring 44 when loads are applied to the pan 30. However, the slot 76 serves to limit the movement of the arm 42 under the influence of abnormal loads. In this respect, it serves to protect the mechanism from accidental injury.

The nozzle 68 is mounted for vertical adjustment in a support 78 fixed to the upper surface of the housing 72, and the nozzle 70 is mounted for vertical adjustment in the horizontal support member 56. Fittings 80 are secured to the outer ends of the nozzle 68 and 70, and serve to connect the nozzles to flexible tubes 82 and 84, respectively, which pass through openings in the vertical support plate 2.

FIGS. 5 and 6 illustrate the structure disposed within the housing 10. The housing 10 is rigidly connected to the vertical support plate 2 and includes a base 90, a side wall 92 and a top wall 94.

Connected rigidly to the base 90 by welding or other suitable means is a sample chamber 96. As indicated in FIG. 6, the sample chamber 96 has a cylindrical bore and is open at its upper end, where it passes through an opening in the top member 94.

Disposed within the sample chamber 96 is an inverted cup-shaped member 98 which serves to distribute the air entering the lower end of the chamber. The member 98 includes a perforated top wall 100 substantially filling the bore of the sample chamber 96, and a cylindrical side wall 102 spaced slightly from the vertical wall of the sample chamber 96 and resting upon the bottom of the sample chamber 96. The sample chamber 96 is provided with an opening in its lower end portion for a fitting 104 which connects the portion of the chamber below the plate 100 with a flexible air tube 106. Air entering the chamber passes through a plurality of perforations 107 in the side wall 102 into the interior of the member 98, from which it may move upwardly through the holes 108 in the top wall 100. A screw 110 secures the member 98 in position relative to the bottom of the sample chamber 96.

The upper end of the sample chamber 96 receives a removable plug or closure member 112, best illustrated in FIG. 9. The closure member 112 includes a barrel portion 114 which fits loosely within the bore of the sample chamber 96 and has a laterally projecting flange 116 at its upper end. The flange 116 rests against the top wall of the sample chamber 96 and forms an airtight seal therewith. The bottom of the plug 112 is provided with a number of small perforations 118 which permit the passage of air from the sample chamber 96 upwardly into a space 120 which communicates with the atmosphere by way of four enlarged vertical passageways 122. Air may also enter the vertical passageways 122 through openings 124 in the sides of the barrel portion 114 of the member 112.

A screw 126 having an enlarged head 128 is threadedly connected to and extends upwardly from the central portion of the barrel 114 for a purpose which will be described below. A nut 130 engages the screw 126 and serves to lock it in an adjusted position with respect to the barrel 114.

Also mounted in the housing 10 is an air switch structure which includes a cylindrical barrel 132 fixed rigidly to the top member 94 of the housing 10. The barrel 132 is hollow and it carries a number of fittings 134 which connect its interior with flexible tubes leading to and from the air switch. One of these tubes 136 is illustrated in FIG. 5. The other tubes have been omitted, however, in the interest of clarity.

Disposed within the barrel 132 of the air switch is an elongated valve element 138 which is best illustrated in FIG. 8. The valve element 138 includes a head 140 at its upper end, and a portion 142 of greater diameter than the barrel 132. The portion of the valve element 138 which extends within the barrel 132 is of varying cross section, and four flexible sealing elements 144 are positioned in spaced apart relation along its length and arranged to contact the interior wall of the barrel 132. In this manner, the valve element 138 cooperates with the barrel 132 to form a plurality of vertically spaced air chambers.

Moreover, these air chambers may occupy different zones along the length of the barrel 132, depending upon the vertical position of the valve element 138. As illustrated in FIG. 6, the valve element 138 is in its uppermost position. It is caused to assume this position by a headed pin 146 which is guided by a sleeve 147 and urged upwardly from the base member 90 of the housing 10 by means of a compression spring 148. When the headed pin 146 abuts against the lower end of the barrel 132, as in FIG. 6, the valve element 138 occupies its uppermost position. However, the valve element may be depressed when desired, so as to compress the spring 148, as illustrated in FIG. 5. The lowermost position of the valve element 138 is reached when the portion 142 thereof abuts against the upper end of the barrel 132.

Depression of the valve element 138 may be effected by manipulation of a linkage attached to the top member 94 of the housing 10. This linkage includes an arm 150 pivotally mounted as at 152, upon a vertical member 154 fixed rigidly to the top member of the housing 10. Also pivoted to the member 154, at 156, is an actuating handle 158. The actuating handle 158 is connected to the arm 150 by means of a link 160 which is pivoted at its ends to the handle and to the arm, respectively, at the points 162 and 164. A projection 166 on the link 160 is in position to bear against the upper surface of the arm 150 when the actuating handle 158 is in its forwardmost position (FIG. 5).

It will be seen that the arrangement just described forms a toggle type latch. Movement of the actuating handle 158 from its rearmost position (FIG. 6) to its forwardmost position (FIG. 5) causes a swinging movement of the line connecting the pivots 162 and 164 across the line connecting the pivots 156 and 162, so that in the forwardmost position of the parts, the force of the compression spring 148, applied through the valve element 138 to the arm 150, tends to urge the actuating handle 158 forwardly about its pivot 156.

It should be noted that the forward end portion of the arm 150 of the latch bears against the head 128 of the screw 126 attached to the plug 112 for the sample chamber 96. As mentioned heretofore, the vertical position of the head 128 may be adjusted, if necessary, by manipulation of the screw 126 and the lock nut 130 so that the arm 150 will bear against the head 128 with sufficient force to bring the flange 116 on the plug 112 into sealing engagement with the upper end of the sample chamber 96.

The housing 10 also carries two needle valves 168 and 170. The structures of these valves are substantially identical and a description of the valve 168, shown in detail in FIG. 11, will suffice for both.

The valve 168 includes a housing 171 having a threaded upper end portion which receives a pair of lock nuts 172 which may be disposed upon opposite sides of the top member 94 to secure the valve in position. The lower portion of the housing 171 is provided with an air inlet 173, an air outlet 174 in substantially free communication with the inlet 173, and an air outlet 175 in restricted communication with the inlet 173. A plug 176 is disposed in the lower end of the housing 171 and is formed with a large opening 177 which serves to connect the inlet 173 and the outlet 174. The plug also is provided with a restricted vertical opening 178 through which air may pass from the inlet 173 to a zone disposed above the upper end of the plug 176.

Cooperating with the upper end of the plug 176 is a valve stem 179 having a tapered lower end portion disposed in proximity to the plug 176. This valve stem is free to move vertically along the housing 171 so as to vary the resistance to passage of air from the opening 178 in the plug 176 to the air outlet 175. Such movement takes place under the control of a cap 180 threadedly mounted upon the upper end portion of the housing 171 in position to bear against a head 181 upon the upper end of the valve stem 179. A compression spring 182 disposed between the upper end of the housing 171 and the head 181 serves to maintain the head 181 in contact with the cap 180.

Referring again to FIG. 1, it is pointed out that the vertical support plate 2 additionally is provided with supports for certain standards used in calibrating and operating the instrument. A hook 183 removably supports a standard weight 184 which corresponds to the weight of a sample to be tested, and a ring 186 removably supports a member 188 of standard permeability or porosity.

The structure of the member 188 is illustrated in greater detail in FIG. 10. It includes a cylindrical plug having a body portion 190 of a size such that it may be inserted into the open upper end of the sample chamber 96 in lieu of the closure member 112. A flange 192 and a flexible sealing element 194 are disposed to overlie and form an airtight seal with the upper edge of the wall of the sample chamber 96. The member 188 also includes a screw 196 and a lock nut 198, corresponding to the screw 126 and the lock nut 130 on the closure member 112. Air may flow through the member 188 along two restricted vertical openings 199 in the body portion 190 thereof.

The operation of the instrument now will be described with reference to the flow diagram shown in FIG. 7. In order to avoid any possibility of confusion due to the diagrammatic nature of the illustration of some of the parts in this view and, at the same time, to demonstrate the correlation between this view and the other views, the reference numerals employed in FIG. 7 correspond to certain of those employed in the other views with the exception that the character "a" has been added to them.

The first operation is to obtain a sample of porous material of a standard weight for which the instrument is designed. This is accomplished by a check-weighing procedure.

The lever 158 is moved to its rearmost position (FIG. 6) to allow the valve element 138 in the air switch to move upwardly. This condition is indicated by the dot-dash line representation of the element 138a in FIG. 7. Then the standard weight 184 is placed upon the pan 30 of the weighing mechanism, and a few pumps with the atomizer bulb 22 conditions the instrument so that a reading of the meter 8 may be obtained.

The flow pattern can best be traced in FIG. 7. Air passes from the bulb 22a through the filter 18a to the pressure regulator 6a in a manner which will be obvious. The flow from the regulator 6a is divided at the juncture 200 into two paths 202 and 204 which lead to different chambers in the air switch through capillary restrictors 206 and 208, respectively, which preferably are of a suitable design to promote laminar flow of the air. In the instrument of FIGS. 1 through 6, these restrictors are disposed in tubes extending along the back of plate 2.

It will be seen that the chamber of the pressure regulator below the piston 24 provides a zone of common fluid pressure or phrased differently, a common body of fluid for the two paths 202 and 204. Similarly, the atmosphere provides another zone of common fluid pressure, or common body of fluid, into which the air discharges from the system.

At the air switch, the flow from the path 202 enters a chamber which is in open communication with a passage 84a leading to a jet 70a disposed below the movable arm 42a of the weighing mechanism. Such chamber also is in open communication with a passage 136a which leads through the base of the needle valve 168a to one side of a diaphragm 210 in the meter 8a.

Similarly, the air switch connects the path 204 to a passage 82a leading to a jet 68a above the arm 42a and also to the other side of the diaphragm 210 in the meter 8a.

It is believed that the flow pattern just described will be recognized by persons skilled in the art as corresponding to a conventional electrical Wheatstone bridge. Air passes from a common source through two flow paths to a common chamber, which in this case is the atmosphere. Moreover, each of the flow paths consists of a pair of resistors or flow restrictors, and the meter 8a is connected so as to measure the pressure differential between points in the two flow paths disposed, respectively, between the two resistors in such path. The first resistor in each path has a fixed value, but the second resistor in each path is variable, dependent upon the position of the movable member 42a of the weighing mechanism. If this deflectable member is closer to the jet 70a than to the jet 68a, the resistance of the jet 70a will be greater than the resistance of the jet 68a, and the pressure on the side of the diaphragm 210 connected to the jet 70a will be greater than the pressure on the side connected to the jet 68a.

This pressure differential will, of course, be reflected in a distortion of the diaphragm 210 of the meter 8a, and the needle of the meter will move to some point along the scale, to indicate the degree of deflection of the arm 42a of the weighing mechanism. The reading of the meter under these conditions should be noted by the operator.

Then the standard weight 184 is removed from the pan 30 and a sample of cotton or other porous material is placed upon the pan. A few pumps on the atomizer bulb will again condition the system so as to cause the meter 8a to reflect the amount of movement of the movable arm 42a, of the weighing mechanism. If the new meter reading is the same as the reading obtained by use of the standard weight 184, the sample in the weighing pan 30 is of the correct weight. However, if the reading is different, cotton may be added to or removed from the pan 30 to bring the reading into conformity with the reading obtained by the use of the standard weight 184.

It has been found that the check-weighing process just described can be simplified substantially by providing the scale of the meter 8a with a conspicuous mark representing a standard reading for the weighing operation, and by so mounting the movable arm 42 of the weighing mechanism that it may be adjusted to bring the needle of the meter to such mark when the standard weight 184 is in the pan 30. In the illustrated embodiment of the invention, such adjustment can be accomplished by moving the screw 62 to pivot the block 48 which supports the spring 44 of the weighing mechanism. If the initial deflection of the needle of the meter when the standard weight 184 is placed in the weighing pan 30 does not bring it to the mark on the meter scale, the screw 62 may be adjusted as required to accomplish this result.

The second operation to be carried out in using the instrument of this invention is a test of the porosity or permeability of the porous material. As explained in Hertel Patent No. 2,352,835, the permeability of a known mass of fibers can be translated, by suitable mathematical computations, into a representation of the fineness of the fibers in the sample. In the present apparatus, such computations are taken into account in the establishment of the scales on the meter 8, so that direct "fineness" readings are obtained from the meter when the apparatus is employed to test permeability.

Before proceeding with an actual permeability test, it is desirable to calibrate the apparatus. This is accomplished by operating the instrument with the standard 188 of known permeability in the sample chamber 96 in place of the sample itself and the closure member 112. When the standard 188 is in place, the lever 158 is moved forwardly to depress the valve element 138 of the air switch and to lock the standard 188 in sealing engagement with the periphery of the sample chamber 96. The depressed condition of the valve is indicated in full lines in FIG. 7.

Manipulation of the atomizer bulb 22 causes air to flow through the filter 18a, the pressure regulator 6a and the paths 202 and 204 to chambers in the air switch. At the air switch, the path 202 communicates with path 106 leading to the sample chamber 96a and with a path leading to the diaphragm 210 of the meter 8a through the base of the needle valve 168a. Similarly, the air swicth connects the path 204 to a passage leading directly to the other side of the diagram 210 and to a path leading to the base of the needle valve 170. A passage connects the upper portion of the needle valve 168 to the opposite side of the base of the needle valve 170.

Again it will be recognized that the fluid circuits form a bridge system. Hence, when the atomizer bulb 22a is manipulated to cause flow of air through the circuit, the meter 8a will reflect any pressure difference which may exist between the intermediate points of the two legs of the bridge.

A convenient check point for the calibration of this second bridge is a "zero" situation in which the meter reflects no pressure differential. As is well known in the electrical arts, no voltage difference between the intermediate points of a bridge exists when the products of the diagonally opposite resistances of the bridge are equal. A similar condition may be established in the fluid bridge of this invention if one of the vertical openings 199 in the standard calibrator 188 is proportioned so that the product of the resistance of this opening and the resistance of the restrictor 208 is equal to the product of the resistance of the needle valve 170 (when properly adjusted) and the resistance of the restrictor 206.

With such a structure, the system may be checked or "calibrated" by forcing air through it when the other of the openings 199 in the standard 188 is closed by a finger on the free hand of the operator. If the meter 8a does not give a reading corresponding to no pressure differential across the bridge, the needle valve 170 may be adjusted as required to effect such a reading.

Another check on the system may be obtained by forcing air through it with both of the openings 199 in the standard calibrator 188 free. Since the permeability of the standard is known, the operator can readily determine the accuracy of the meter reading under such circumstances.

If the readings of the meter 8a satisfy both of the calibration checks just described, the operator may proceed with the testing of a weighed sample of porous material. If not, and if the system cannot be brought into adjustment by manipulation of the needle valve 170, the operator should check for leaks in the system, irregularities in the meter itself, etc.

After calibration of the instrument, the standard 188 is removed from the sample chamber 96 and the sample of porous material is placed in the chamber. Manipulation of the atomizer bulb 22 then conditions the system so that a reading may be obtained. Since the permeability of the sample determines the resistance to air flow offered by the sample chamber, the pressure differential indicated by the meter is a function of the permeability of the sample.

Moreover, as pointed out above, the permeability of a sample of fibers is an indication of the "fineness" of the fibers which make up the sample. Since the permeability test just described is carried out on a sample of known weight, established by the check-weighing operation, and since the volume of the sample is constant, being fixed by the volume of the sample chamber 96 which it completely fills, the meter 8 may be scaled or calibrated so as to give direct "fineness" readings.

It will be seen that the needle valve 168 forms a portion of a shunt path around the meter 8a. Adustment of this needle valve then serves to adust or vary the resistance of the shunt path, so as to vary the sensitivity of the meter 8. Adjustments of this type are necessary to compensate for pressure variations which may arise in connection with the operation of the equipment due to atmospheric conditions, wear in the pressure regulator 6, etc.

If desired, however, the needle valve 168 might be omitted from the system, and the necessary adustments accomplished by adding or removing weight from the free piston 24 of the pressure regulator 6. This alternative procedure usually is not as easy to carry out as the adjustment of a needle valve, but it produces satisfactory results in some situations.

Although a specific embodiment of the invention has been described in detail, certain modifications and variations will be obvious to persons skilled in the art. Also, it will be apparent that the fluids other than air may be utilized in the invention, that the materials other than fibers may be tested, and that certain features of the invention have utility and advantages in combinations other than that specifically described herein. It is intended, therefore, that the foregoing description be considered exemplary only, and that the scope of the invention be ascertained from the following claims.

I claim:

1. Apparatus for weighing a sample of porous material and determining the resistance offered by such sample to fluid flow; comprising resilient means for supporting a sample to be weighed and including a movable member adapted to assume different positions under the influence of samples of different weights, a first pair of fluid conduits having their discharge ends disposed on opposite sides of and in such proximity to said movable member that a change in the position of said member lowers the resistance to fluid flow out of one of said conduits and increases the resistance to fluid flow out of the other of said conduits; a second pair of fluid conduits discharging to a zone of common fluid pressure, one of said conduits of said second pair being constructed to contain the weighed sample and the other having a substantial resistance to fluid flow; a third pair of fluid conduits connected together at their intake ends and each having a substantial resistance to fluid flow; means for delivering fluid under pressure to the connected intake ends of the conduits of said third pair; means connected across the discharge ends of the conduits of said third pair for measuring fluid pressure differences; and a fluid switch operable selectively to connect the discharge ends of the conduits of said third pair to the intake ends of the conduits of said first and second pairs so as to selectively establish two bridge circuits, one of which contains the conduits of said first and third pairs and the other of which contains the conduits of said second and third pairs.

2. Apparatus as claimed in claim 1 wherein the resistance of said other conduit of said second pair of fluid conduits is adjustable to facilitate calibration of said other bridge circuit.

3. Apparatus as claimed in claim 1 wherein a conduit of adjustable resistance to fluid flow is connected in parallel with said means for measuring fluid pressure differences to permit adjustments in the sensitivity of the apparatus.

4. Apparatus as claimed in claim 1 wherein said one conduit of said second pair includes a sample chamber of a predetermined fixed volume, and wherein a standard weight is provided so that a sample of porous material having a predetermined weight may be obtained by a check-weighing procedure.

5. Apparatus for weighing a sample of porous material and determining the resistance offered by such sample to fluid flow; comprising resilient means for supporting a sample to be weighed and including a movable member adapted to assume different positions under the influence of samples of different weights, a first pair of fluid conduits having their discharge ends disposed on opposite sides of and in such proximity to said movable member that a change in the position of said member lowers the resistance to fluid flow out of one of said conduits and increases the resistance to fluid flow out of the other of said conduits; a second pair of fluid conduits discharging to a zone of common fluid pressure, one of said conduits of said second pair including a sample chamber for the weighed sample and a removable perforate closure which may be urged into sealing relationship with an end of said chamber, the other of said conduits of said second pair having a substantial resistance to fluid flow; a third pair of fluid conduits connected together at their intake ends and each having a substantial resistance to fluid flow; means for delivering fluid under pressure to the connected intake ends of the conduits of said third pair; means connected across the discharge ends of the conduits of said third pair for measuring fluid pressure differences; a fluid switch including a barrel and a reciprocable element extending within said barrel and cooperating with the interior thereof to form movable fluid chambers for selectively connecting said third pair of conduits with the conduits of said first and second pairs; means for biasing said reciprocable element toward a position in which the conduits of said first and third pairs are connected together; and a toggle latch disposed adjacent said closure of said sample chamber and said reciprocable element for locking said closure in sealing engagement with said chamber and for locking said reciprocable element in a position in which the conduits of said second and third pairs are connected together.

6. Apparatus for measuring the fineness of fibers comprising: resilient means for supporting a fiber sample and including a movable member adapted to assume different positions under the influence of samples of different weights; a first pair of fluid passages discharging to a first zone of common fluid pressure, one of said passages having its discharge end disposed in such proximity to said movable member that a change in the position of said member changes the resistance to fluid flow out of said passage, the other of said passages having a substantial resistance to fluid flow; a second pair of fluid passages discharging to said first zone of common fluid pressure, one of said passages of said second pair including a sample chamber for receiving a sample of constant weight, said sample chamber being constructed to provide a constant volume for confining said sample, the other of said passages of said second pair having a substantial resistance to fluid flow; a third pair of fluid passages connected at their intake ends to a second zone of common fluid pressure and each having a substantial resistance to fluid flow; means for raising the pressure in said second zone of common fluid pressure relative to the pressure in said first zone of common fluid pressure; means connected across the discharge ends of the passages of said third pair for measuring the difference in pressure between said ends; and a fluid switch operable selectively to connect the discharge ends of the passages of said third pair to the intake ends of the passages of said first and second pairs so as to selectively establish two bridge circuits, one of which contains the passages of said first and third pairs and the other of which contains the passages of said second and third pairs.

7. Apparatus for measuring the fineness of fibers comprising: resilient means for supporting a fiber sample to be weighed and including a movable member adapted to assume different positions under the influence of samples of different weights; a first pair of fluid conduits discharging to a zone of common fluid pressure, one of said conduits of said first pair having a discharge end disposed in such proximity to said movable member that a change in the position of said member changes the resistance to fluid flow out of said conduit, the other of said conduits of said first pair having a substantial resistance to fluid flow; a second pair of fluid conduits discharging to a zone of common fluid pressure, one of said conduits of said second pair including a sample chamber for a weighed fiber sample, said sample chamber including a movable end member adapted to be moved to a predetermined position after insertion of a sample, the other of said conduits of said second pair having a substantial resistance to fluid flow; a third pair of fluid conduits connected at their intake ends to a zone of common fluid pressure and each having a substantial resistance to fluid flow; means for establishing a pressure differential between said zones of common fluid pressure to cause fluid to flow into the intake ends of the conduits of said third pair; means connected across the discharge ends of the conduits of said third pair for measuring fluid pressure differences; a fluid switch including a barrel and a reciprocable element extending within said barrel and cooperating with the interior thereof to form movable fluid chambers for selectively connecting said third pair of conduits with the conduits of said first and second pairs; means for biasing said reciprocable element toward a position in which the conduits of said first and third pairs are connected together; and mechanical means for simultaneously shifting said reciprocable element into a position in which the conduits of said second and third pairs are connected together and also bringing said end member of said sample chamber to said predetermined position.

8. Portable apparatus for determining the fineness of fibers comprising: resilient means for supporting a fiber sample to be weighed and including a movable member adapted to assume different positions under the influence of samples of different weights; an air chamber; manual means for elevating the pressure of air in said chamber; means for regulating the pressure in said chamber to hold the pressure at a constant level during a measuring operation; and a fluid flow bridge system connected at one end thereof with said chamber and discharging to atmosphere; said fluid flow bridge system including as one unknown resistance a conduit having its discharge end disposed in such proximity to said movable member that a change in the position of such member changes the resistance to air flow out of the conduit, including as another unknown resistance an air passage constructed to contain the weighed fiber sample, and including fluid switch means operable selectively to first bring said conduit into active relation with the bridge system to permit a weight determination and to then bring said passage into active relation with the bridge system to permit a determination of porosity.

9. Apparatus for measuring the fineness of fibers comprising: resilient means for supporting a fiber sample and including a movable member adapted to assume different positions under the influence of samples of different weights; a first pair of air passages discharging to atmosphere, one of said passages having its discharge end disposed in such proximity to said movable member that a change in the position of said member changes the resistance to air flow out of said passage, the other of said passages having a substantial resistance to air flow; a second pair of air passages discharging to atmosphere, one of said passages of said second pair including a sample chamber for receiving a weighed sample, the other of said passages of said second pair having a substantial resistance to air flow; a third pair of air passages connected together at their intake ends and each having a substantial resistance to air flow; means for delivering air at a constant pressure above atmospheric to the connected ends of said passages of said third pair; a meter connected across the discharge ends of the passages of said third pair for measuring the difference in air pressure between said ends; and an air switch operable selectively to first connect the discharge ends of the passages of said third pair to the intake ends of the passages of said first pair and to then connect the discharge ends of the passages of said third pair to the intake ends of the passages of the first pair.

10. Apparatus for measuring the fineness of fibers comprising: resilient means for supporting a fiber sample and including a movable member adapted to assume different positions under the influence of samples of different weights; a first pair of air passages discharging to atmosphere, one of said passages having its discharge end disposed in such proximity to said movable member that a change in the position of said member changes the resistance to air flow out of said passage, the other of said passages having a substantial resistance to air flow; a second pair of air passages discharging to atmosphere, one of said passages of said second pair including a sample chamber for receiving a weighed sample of predetermined weight, said sample chamber being constructed to provide a constant volume for confining said sample, the other of said passages of said second pair having a substantial resistance to air flow; a third pair of air passages connected together at their intake ends and each having a substantial resistance to air flow; means for delivering air at a constant pressure above atmospheric to the connected ends of said passages of said third pair; a meter connected across the discharge ends of the passages of said third pair for measuring the difference in air pressure between said ends, said meter having a face provided with a mark indicating said predetermined sample weight and provided with a fiber fineness scale; and an air switch operable selectively to first connect the discharge ends of the passages of said third pair to the intake ends of the passages of said first pair and to then connect the discharge ends of the passages of said third pair to the intake ends of the passages of the first pair.

References Cited in the file of this patent

UNITED STATES PATENTS

| | | |
|---|---|---|
| 751,295 | Jones | Feb. 2, 1904 |
| 751,296 | Jones | Feb. 2, 1904 |
| 1,531,096 | Hoffman | Mar. 24, 1925 |
| 2,352,835 | Hertel | July 4, 1944 |
| 2,392,637 | Boehler | Jan. 8, 1946 |
| 2,518,484 | Matthews | Aug. 15, 1950 |
| 2,634,081 | Knobel | Apr. 7, 1953 |
| 2,651,198 | Hayward | Sept. 8, 1953 |
| 2,659,433 | Brown | Nov. 17, 1953 |
| 2,699,932 | Knobel | Jan. 18, 1955 |
| 2,706,904 | Hertel | Apr. 26, 1955 |
| 2,861,451 | Emmons | Nov. 25, 1958 |
| 2,880,609 | Byrkett | Apr. 7, 1959 |